United States Patent [19]

Theodore

[11] 4,292,224

[45] Sep. 29, 1981

[54] HIGHLY FILLED THERMALLY CONDUCTIVE ELASTOMERS II

[75] Inventor: Ares N. Theodore, Farmington Hills, Mich.

[73] Assignee: Ford Motor Company, Dearborn, Mich.

[21] Appl. No.: 109,440

[22] Filed: Jan. 4, 1980

[51] Int. Cl.$^3$ .............................................. C08L 83/04
[52] U.S. Cl. ........................... 260/29.1 SB; 260/37 SB
[58] Field of Search .................... 260/37 SB, 29.1 SB; 528/31

[56] References Cited

U.S. PATENT DOCUMENTS

| | | | |
|---|---|---|---|
| 3,011,987 | 12/1961 | Walton | 260/18 SB |
| 3,098,836 | 7/1963 | Bobear | 260/37 SB |
| 3,177,238 | 4/1965 | Rince | 556/457 |
| 3,179,546 | 4/1965 | Fischer | 156/272 |
| 3,184,427 | 5/1965 | Russell et al. | 260/37 SB |
| 3,255,152 | 6/1966 | Kniege | 260/37 SB |
| 3,274,145 | 9/1966 | Dupree | 260/37 SB |
| 3,399,082 | 8/1968 | Henderson et al. | 136/203 |
| 3,499,859 | 3/1970 | Matherly | 260/37 SB |
| 3,506,607 | 4/1970 | Bobear | 260/37 SB |
| 3,676,420 | 7/1972 | Fulton et al. | 260/37 SB |
| 3,746,662 | 7/1973 | Adelman | 252/513 |
| 3,791,998 | 2/1974 | Bruns | 260/37 SB |
| 3,865,784 | 2/1975 | Neale et al. | 260/37 SB |
| 3,867,315 | 2/1975 | Tigner et al. | 260/37 M |
| 3,933,712 | 1/1976 | Vanaglash | 528/31 |
| 3,968,055 | 7/1976 | Palmer | 260/37 SB |
| 3,969,310 | 7/1976 | Itoh et al. | 260/37 SB |
| 3,970,504 | 7/1976 | Palmer | 260/37 SB |
| 4,009,043 | 2/1977 | Preis | 260/37 SB |
| 4,025,485 | 5/1977 | Kodama et al. | 260/37 SB |
| 4,026,835 | 5/1977 | Lee et al. | 260/37 SB |
| 4,026,868 | 5/1977 | Merrill | 260/37 SB |
| 4,069,083 | 1/1978 | Palmer | 260/33.6 SB |
| 4,070,329 | 1/1978 | Homan et al. | 260/37 SB |
| 4,075,154 | 2/1978 | Itoh et al. | 260/37 SB |
| 4,076,684 | 2/1978 | Wohlfarth et al. | 260/37 SB |
| 4,130,707 | 12/1978 | Leiser et al. | 528/15 |
| 4,148,354 | 4/1979 | Rao | 165/8 |

*Primary Examiner*—Lewis T. Jacobs
*Attorney, Agent, or Firm*—Lorraine S. Melotik; Roger L. May

[57] ABSTRACT

The invention comprises a thermally conductive elastomer suitable for high temperature, e.g., 240°–260° C., mechanical applications. The elastomer composition comprises organosiloxanes, particulates and a viscosity modifier. The organosiloxane crosslinks between the vinyl or allyl functionality of an organopolysiloxane polymer and the silyl hyride functionality of an organopolysiloxane oligomer. The particulate comprises silica as well as a thermally conductive carbon powder. The addition of a viscosity modifier comprising silicon oil is essential to the inclusion of the high levels of particulates.

10 Claims, No Drawings

HIGHLY FILLED THERMALLY CONDUCTIVE ELASTOMERS II

BACKGROUND OF THE INVENTION

Elastomers for use in rotary regenerator assemblies are known, e.g., see U.S. Pat. No. 4,148,354 which is herein hereby incorporated by reference. These assemblies comprise ceramic core surrounded by steel ring gear with elastomer therebetween. The elastomer accommodates differential rates of expansion during assembly and during operation.

Materials proposed in U.S. Pat. No. 4,148,354, while satisfactory, do have certain deficiencies. For example, the materials do not function optimally for as long periods as might be desired.

A particularly acute problem is that these materials tend to degrade during extended high temperature service. Others have proposed certain filled organosiloxane and other organic polymers for use in making articles that resist degradation when exposed to extreme conditions. See, for example, U.S. Pat. Nos. 3,098,836; 3,255,152; 3,274,145; 3,506,607; 3,676,420; 3,746,662; 3,791,998; 3,865,784; 3,867,315; 3,911,045; 4,025,485; and 4,069,083.

These patents show that desirable properties may result by loading certain organic polymers with inorganic particulate. It has been discovered in accordance with this invention that besides enhancing certain physical properties as well as potentially reducing material costs, certain particulates also offer improved thermal stability. Improved thermal stability is insufficient by itself, however, to provide a more acceptable material for applications as ring gear assemblies. Rather, such improved thermal stability, when provided by increased particulate loading, is accompanied typically by higher initial viscosities and shorter working times. The higher initial viscosities and shorter working times can make such materials undesirable for high volume production use.

Graphite and certain carbon blacks have been previously suggested for use in combination with certain organopolysiloxanes (see, for example, U.S. Pat. Nos. 3,184,427; 3,399,082; 3,968,055; 3,970,504; 3,969,310 and 4,020,014. U.S. Pat. No. 3,184,427, however, differs with respect to the polymers used and makes no suggestion that graphite may improve high temperature stability of elastomers of this invention. U.S. Pat. Nos. 3,968,055 and 3,970,504 suggest use of a temporary dispersing agent while U.S. Pat. No. 3,399,082 suggests use of graphite in thin emmissive layers. U.S. Pat. No. 3,969,310, on the other hand, suggests use of graphite particulate in dipping or potting application. Finally, U.S. Pat. No. 4,020,014 relates to hot air, peroxide cured compositions with carbon blacks.

As compared to elastomers of commonly assigned U.S. Ser. No. 109,446 and U.S. Ser. No. 109,445 filed concurrently herewith in the names of Theodore et al and Theodore, respectively, the elastomers of this invention, surprisingly, generally have higher thermal conductivity and do not advance hardness as greatly during accelerated aging. Moreover, as compared to elastomers of commonly assigned U.S. Ser. No. 109,439, filed concurrently herewithin the name of Theodore and Lemieux, the elastomers of this invention additionally provide economic advantage.

It is an object of this invention to provide elastomers with improved thermal stability.

It is an object of this invention to provide elastomers with improved thermal stability and whose precursors have desirable initial viscosities and working times.

It is an additional object of this invention to provide elastomer precursors for filling difficult to fill mold cavities.

It is even a still further object of this invention to provide improved elastomer for use in rotary regenerators comprising ceramic core surrounded by steel or other metal ring gear.

These and other objects have been accomplished with elastomers made in accordance with the hereinafter disclosed invention.

BRIEF DESCRIPTION OF THE INVENTION

This invention relates to highly filled, thermally conductive elastomers made from ingredients that include organopolysiloxanes and inorganic particulate. By admixing these and other essential ingredients in certain ways, there is provision of elastomer precursor compositions that readily fill difficult to fill mold cavities and yet, when cured, exhibit such physical and thermal properties as to make them admirably suited for high temperature, mechanical service.

In elastomer precursor compositions of this invention, crosslinking occurs between such functional groups as vinyl of one organopolysiloxane and such functional groups as silyl hydride of another organopolysiloxane in the presence of catalyst and certain other ingredients. Among these other ingredients are conductive carbon particulates that contribute to high temperature stability and improved physical properties of the elastomer.

Certain viscosity modifiers serve to facilitate incorporation of high particulate levels into the elastomer precursors while at the same time permitting desired initial viscosities and working times. By selection and control of particulate size and amount as well as viscosity modifier type and amount, there is a net increase in thermal and physical properties. At the same time there is provision thereby of elastomer precursors with such initial viscosities and working times as to permit ready incorporation into difficult to fill mold cavities.

Surprisingly, even though the viscosity modifier is liquid and may be expected to be non-reactive, the amount of conductive carbon particulate, for example, that it allows to be effectively incorporated gives elastomers which show even less high temperature weight loss than the same elastomers without any conductive particulate and viscosity modifier. Thus, the conductive particulate and liquid viscosity modifier combination in the elastomer acts, with respect to thermal aging, as if it were a more stable filled, crosslinked polymer than the filled, crosslinked organopolysiloxane polymer without such combination. With spherical or irregular shaped particulates (e.g. L/D-8) as the powders of this invention, the above described benefit is particularly notable.

DETAILED DESCRIPTION OF THE INVENTION

The elastomers of this invention are made by intimately admixing a polymer containing base component (Component I) and an oligomer containing component (Component II). With admixture, the polymer and oligomer in the Components I and II crosslink at room temperature (or elevated temperature, if desired) to provide (with the other ingredients in the components) thermally conductive elastomers. The ingredients of Components I and II preferably are as follows:

A. Component I. Component I comprises 100 parts by weight of a crosslinkable polymer (Polymer I). Polymer I is of a formula corresponding to

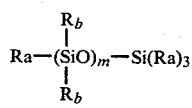
$$R_a\text{—}(SiO)_m\text{—}Si(R_a)_3 \quad \text{with } R_b \text{ substituents} \tag{I}$$

wherein at least most of the Ra's and Rb's are independently selected from (A) any one or more of 1. saturated hydrocarbyl groups having from about 1–10 carbon atoms or 2. saturated hydrocarbyloxy groups having from 1 to about 10 carbon atoms that are alkyl or aryl or alkyl and aryl carbons and (B) either or both allyl or vinyl which may be substituted by halo or saturated hydrocarbyl or hydrocarbyloxy groups having between about 1–8 carbon atoms that are alkyl or aryl or aryl and alkyl carbon atoms wherein there are up to two of these substituents per vinyl or allyl. Up to about 25% (preferably up to 10%) of the total number of Rb's may correspond to the formula:

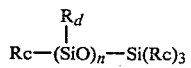
$$R_c\text{—}(SiO)_n\text{—}Si(R_c)_3 \quad \text{with } R_d \tag{I(a)}$$

wherein at least most of the Rc's and Rd's are selected from (A) and (B) above but up to about 10% (preferably 5%) of the total number of Rd's may contain additional siloxane units such as those of formula II above with substituents selected from (A) and (B) above or still additional siloxane units. Provided, however, that there is: (1) an average number of siloxane units (i.e. m plus all n's plus the total number of end groups) per polymer molecule between about 100 and 300 (preferably 150–250) and (2) an average of above about 1 but lower than 6 (preferably about 1.5–2.5) crosslinking sites selected from the vinyl, allyl or vinyl and allyl groups per polymer molecule. Preferably, m averages between about 170–220 and n is below 50. More preferably n is below 25 and less than 10% of the Rb's are siloxane units. Also, preferably the vinyl or allyl groups are on end siloxane groups e.g., the vinyl or allyl groups in the position of Ra or Rc. Examples of the hydrocarbyl and hydrocarbyloxy groups are alkyl, aryl, alkaryl, aralkyl such as straight and branched alkyl, straight or branched alkyl substituted phenyl, phenyl, phenyl substituted straight or branched alkyl including for example methyl, ethyl, butyl, methylphenyl, phenylethyl etc. any of which may be substituted by normally unreactive substituents such as halo (e.g. chloro) or interrupted by oxy (—O—). Examples of commercially available polymers for Polymer I are Silastic J, E & L RTV silicone elastomers available from Dow Corning Corporation.

Especially preferred polymers for Polymer I of Component I correspond mostly by weight (e.g. 90% or higher) to the formula

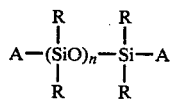
$$A\text{—}(SiO)_n\text{—}Si\text{—}A \quad \text{with R substituents} \tag{I'}$$

wherein each R is independently a monovalent aliphatic or aromatic group or combination thereof of up to about 8 carbon atoms and preferably is independently selected from R' (O)$_x$ wherein x is zero or 1 and R' is phenyl or alkyl of up to about 8 carbons (more preferably 1–3) or alkylphenyl (or phenylalkyl) having up to about 6 alkyl carbons (more preferably up to 3 alkyl carbons); each A is vinyl; and n averages between about 150–200.

Component I also contains silica particulate intimately admixed with the Polymer I. The silica preferably is a combination of silicas comprising ground and fumed silicas. Preferably the weight ratio of silica to Polymer I is between about 1:4 to 3:1, more preferably between about 1:2 to 2.5:1, and even more preferably between about 0.9:1 to 1:0.9.

The silica is desirably of small particle size so as to not only provide reinforcement but also impart thixotropic behavior to the compositions. Preferred Polymer I and silica admixtures have viscosities between about 500–1500 poises at 25° C.

As mentioned, it is preferred to have a combination of silicas comprising ground and fumed silica. Normally, the weight of ground silica such as those having an average (i.e. mean) diameter between about 0.1–15 (more preferably 0.5–10) microns will desirably far exceed the weight of fumed silica e.g. a weight ratio of 2:1 or more as preferably between about 5:1 to 19:1. The fumed silica (at an average particle diameter of between about 0.005–0.015 microns, more preferably between about 0.010 microns and 0.014 microns) provides reinforcement to the elastomer. The ground silica imparts better flow properties to the uncured elastomer composition. The balance of these two silica types then is of importance for control of desired elastomer precursor and cured elastomer properties.

Other inorganic particles that may be added include, for example, glass fibers, if additional reinforcement (especially improved hot tear resistance) of the elastomer is desired. Chopped fiber with lengths of between about 0.34 and 1.25 centimeters, especially between about 0.5–1 centimeters, are preferred. Improved adhesion of glass fiber in the cured thermally conductive elastomer can be accomplished through coating of the glass fibers with primers which are commercially available. For example, Dow Corning Primer Q 3-6061 (e.g. at 0.15 g primer to 1 kg glass fibers) diluted with methylene chloride may be used to pack and coat the glass fibers. Other fibers such as carbon, graphite, cellulose, metal may be employed together with or in place of the glass fibers.

In addition, still other ingredients such as zinc oxide, lampblack and the like may be included in component I to improve heat stability and the like functions. Preferably, component I contains a metal catalyst such as platinum to reduce cure time and temperature. (See, for example, U.S. Pat. No. 4,076,684, col. 6, lines 49–68, col. 7, lines 1–2, and the paragraph bridging cols. 7 and 8 which are hereby incorporated by reference). A preferred catalyst is based on platinum and is a platinum complexed silicone oligomer. The oligomer may be of the structure of Polymer I, but wherein m averages less than 50 e.g. 15 or less. Additionally it is preferred to use a modifier with these systems that slows increase in viscosity due to crosslinking e.g. snap time modifiers available from Dow Corning Corporation, benzotriazole, etc. Such modifiers are commercially available and are preferably vinyl silicones of up to 15 repeating siloxane units with desirably up to about 5 reaction thereby slowing increase in viscosity. These vinyl silicones serve to slow down the crosslinking catalyst mentioned above. Other modifiers available for this purpose include quinoline, triphenyl phosphide, dimethyl sulfoxide, perchloroethylene, etc. known to those in the art. Other catalyst may also be used, e.g. peroxides, alkoxides and the like as well as modifiers as is well known in the art.

The conductive carbon powders preferably comprise graphite powders such as synthetic graphites, flake graphites and crystalline graphites or carbon blacks such as furnace blacks and acetylene blacks.

Artificial graphites useful herein include those preferably having largest particle dimensions of between about 5–300 microns. These graphites are commercially available from sources such as Pocco Graphite, Inc., a division of Union Oil Company, Joseph Dixon Crusible Company, etc. These artificial graphites comprise hexagonal sheets produced by graphitizing coke or similar carbons in electric furnaces at above about 3000° C. These graphites have up to about 99.9% or more graphitic carbons.

Flake graphites have a distinct flaky appearance and preferably for use herein have largest particle dimensions between about 5–300 microns. Crystalline graphites suitable herein preferably contain at least about 97% by weight graphitic carbon.

To obtain preferred particle size of between about 5–300 microns in largest particle dimension, the graphite powders may be ground in ball mills.

Smaller particle size graphites (e.g. synthetic graphite having largest particle dimension less than about 15 microns) exhibit (in elastomer precursor compositions of this invention) shorter working times and higher thermal conductivities in the cured elastomer as compared to larger particle size graphites in the same circumstances. On the other hand, larger size graphites (e.g., synthetic graphite having largest particle dimensions above about 35 microns) exhibit respectively longer working times and lower thermal conductivities. Blends of larger and smaller graphites, however, permit optimization of these properties. Alternatively, when longer working times are desired, the elastomer precursors may be formulated to contain, for instance, less than 50 parts by weight smaller graphite particles per 100 parts of combined weight of the polysiloxane polymers, i.e., of combined weight of Polymer I and Oligomer I (which is hereinafter more particularly described). Similarly, inclusion of, for instance, more than 50 parts by weight of the larger graphite particles (e.g. particles with largest particle dimension above about 35 microns) per 100 parts by weight of combined weight of Polymer I and Oligomer I, leads to longer working times.

Of the above mentioned graphites, crystalline graphite offers cured elastomers with generally highest thermal conductivity.

The carbon blacks suitable herein preferably comprise those having largest particle dimensions below one micron and in the colloidal particle size range or below. For example, furnace blacks such as N-650 (largest particle dimension averaging about 0.05 micron), SL-90 (largest particle dimension averaging about 0.1 micron) and N-339 (largest particle dimension averaging about 0.05 microns) that are available from Ashland Chemicals Co. yield desirably processable precursor compositions when compounded at about 50 parts by weight per 100 parts by weight of the polysiloxane polymers, i.e., combined weight of Polymer I and Oligomer I.

As with the graphites, smaller particle sizes provide elastomer precursor compositions with shorter working times and vice versa. Additionally, higher structure carbon blacks also none shorter working times. Normally, however, desirable working times may be maintained by using less than 100 parts by weight of the black per 100 parts by weight of the combined weight of Polymer I and Oligomer I or by increasing the viscosity modifier to greater than 10% by weight of the weight of the precursor composition absent the carbon black.

The conductive carbon particulate may be used at any desired level but is normally at a weight ratio to Polymer I of between about 1:10 to 2.5:1 (preferably about 0.3:1 to 2.0:1) powder to Polymer I.

Essential to the addition of high levels of conductive powders is inclusion of certain amounts of viscosity modifiers to control the initial apparent viscosity of these compositions. A careful balance between particulate including conductive powder and viscosity modifier is important to achieve high thermal conductivity without loss of viscosity modifier and consequent decrease in thermal stability and physical properties of the cured compounds. The viscosity modifier is normally at a weight ratio between about 1:20 to 1:4 (more preferably 1:10–1:2) viscosity modifier to the inorganic particulates of silica and conductive powder depending upon certain other features such as amount and particle size of conductive powder and other particulates as well as viscosity modifier character.

The viscosity modifier preferably comprises a silicone oil having a viscosity of between about 1000–1,000,000 centistokes at 25° C., more preferably 5000–1,000,000 centistokes at 25° C. Preferred viscosity modifiers include those having a formula which corresponds to formula I above for Polymer I except that the vinyl group is replaced by groups similar to the others on the backbone, e.g. alkyl or alkoxy of between about 1–10 carbon atoms. Especially preferred viscosity modifiers are dimethyl silicone oils i.e. polymers of formula I above wherein at least most of the Ra's and Rb's are methyl and particularly wherein there is minimum branching e.g. wherein less than 10% of the Rb's are siloxane units. In addition to dimethyl silicone oils, however, other examples of silicone oils that may be used alone or in combination with dimethyl silicone oils include, for example, methyl phenyl silicone, branched methyl phenoxy silicone, branched chlorophenyl methyl silicone, fluorosilicone, nitrile silicone, methyl hydrogen and methyl vinyl silicone oils.

Especially preferred viscosity modifiers correspond mostly by weight (e.g. 90% or higher) to the formula:

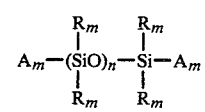

wherein $R_m$ and $A_m$ are alkyl of 1–8 carbons or phenyl or phenyl substituted by alkyl or alkoxy of 1–8 carbons or halo such as chloro; and n is above about 15.

B. Component II. Component II comprises an oligomer (hereinafter, Oligomer I) that crosslinks with Polymer I through the vinyl groups of Polymer I and silyl hydride groups of Oligomer I. Oligomer I preferably has a formula corresponding to that of formula I except that there are an average of more than 1 and less than about 20 silyl hydride groups

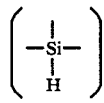

rather than any vinyl or allyl groups; the total number of siloxy groups (i.e. total of all m and n's) averages between about 5–50 and there is little, if any, branching e.g. less than about 5% of the Rb's are siloxane units. Examples of such oligomers include Silastic J curing agent available from Dow Corning Corporation.

Preferred crosslinking agents for the Oligomer I correspond to the formula:

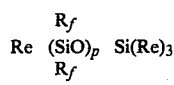

wherein Re and Rf are selected from hydrogen and saturated hydrocarbyl or hydrocarbyloxy of between about 1–10 carbon atoms optionally substituted by halo such as chloro or interrupted by oxy (—O—); p averages between 6–40 and wherein there is an average of at least about two silyl hydrides groups per polymer and up to about one for each siloxy group, more preferably an average between 5 and 15 silyl hydride groups per polymer chain.

Especially preferred crosslinking agents correspond mostly by weight (e.g. than 90% or more) to the formula:

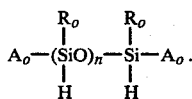

wherein $R_o$ is alkyl or alkoxy of 1–3 carbons, phenyl or phenoxy and is preferably methyl; $A_o$ is alkyl or alkoxy of 1–3 carbon atoms or phenyl or phenoxy and is preferably methyl; and n is between 5–14 on the average.

The crosslinking agent is used at a weight ratio with respect to Polymer I of between about 1:3 to 1:20 Polymer II to Polymer I, but preferably at least about 1 equivalent of silyl hydride for each equivalent of vinyl or other aliphatic unsaturation.

The elastomer precursor compositions of this invention also may contain such other ingredients which are typically included in compositions of the type disclosed herein, e.g. dyes, pigments, heat stabilizers, antioxidants, adhesion promotors, UV absorbers and the like.

The following procedures are used in the examples below to determine working time and physical and thermal properties:

Working Time: After de-aeration some of mix is poured in a 100 ml. beaker for determination of working time with the Brookfield viscometer. A #4 spindle at 0.6 rpm is used for this measurement with the guard in its proper place. The time required for the spindle to move from the starting point to 100 on the instrument scale is called the working time of a composition.

A. Physical Properties

1. Tensile testing of dumbbell specimens: ASTM D 412 procedure is used for determination of tensile strength, 10% modulus and elongation to break. Dumbbell specimens are cut with the standard die from a thin slab (0.32 cm thick) and used for this testing.

2. Durometer Hardness: The hardness of cured silicone rubber is determined according to ASTM D 2240 procedure.

3. Tear Testing: Tear specimens, cut with a die B, are tested according to ASTM D 624 procedure. Razor-nicked specimens are used for determination of tear resistance.

B. Coefficients of Thermal Expansion

The coefficients of thermal expansion are determined with the Dupont 942 thermomechanical analyzer. Sensitivity of this instrument is checked with an aluminum metal standard. Sample height is 0.60 cm and temperature was programmed at 5° C./mm. In all cases the expansion probe is resting on molded surfaces and has zero load. The coefficients of expansion are calculated for the temperature ranges of 25°–300° C. and 200°–300° C.

C. Determination of Thermal Conductivities

The split bar method is used for determining the thermal conductivities of these elastomeric materials. Two specimens are used for these measurements and an average of thermal conductivity is obtained from the two samples. Typical dimensions of thin specimens are 2.14 cm(W)×4.80 cm(L)×0.210 cm(T) and for thick specimen 2.15 cm(W)×4.80 cm(L)×0.65 cm(T). Measurements on two samples of different thickness are used to eliminate temperature drops due to the interfaces between the specimen and copper rod.

The Examples below are intended to illustrate this invention and not necessarily limit its scope.

EXAMPLE 1

In preparing the base for use in compounding thermally conductive silicone elastomers the following ingredients are charged into a Hobart double planetary mixer:

| Component | Amount |
| --- | --- |
| 1. Silastic J RTV Silicone Elastomer + SiO₂ (1) | 1134.0 grams |
| 2. Kadox 15 ZnO | 7.10 grams |
| 3. Williams 1011 Lampblack | 3.55 grams |
| 4. Glass Fibers (¼″ Chopped Strand Coated with Primer) | 12.50 grams |
| 5. Cure Modifier E-1990-76 | 2.10 grams |

After mixing above ingredients for five minutes the base can be stored for subsequent use in preparing the thermally conductive materials.

In making the thermally conductive material the base is combined with the following ingredients:

| Component | Amount |
| --- | --- |
| 1. Base Material | 400.00 grams |
| 2. Synthetic Graphite (Particle Diameter 15 Microns) | 100.00 grams |
| 3. Silicone Fluid (100,000 Centistokes at 25° C.) | 40.00 grams |
| 4. Silastic J Curing Agent | 40.00 grams |

After charging the base in a Ross double planetary mixer, the addition of synthetic graphite (15 microns) follows with mixing for 2 minutes. Then the addition of silicone fluid follows with mixing for 4 minutes. The mix is scrapped off the two blades of mixer and allowed to fall in the middle of steel bowl for improving mixing. Addition of silastic J curing agent is completed in six minutes with mixing. After de-aeration of the mixture for 30 minutes, it is ready for molding and determination of working time with the Brookfield Viscometer (Model LV, Spinde #4). The working time of this mixture is 1 hour.

Molding of mix is carried out by pouring and spreading the mixture in a four cavity, chrome-plated mold kept at ambient temperature. After curing the compound for 20 minutes (top platen of hydraulic press at 232° C. and bottom at ambient temperature) under 70 ton pressure, the rubber slabs are taken out of mold and post cured in an air circulating oven for 3 hours at 202° C. Alternately, the mixture can be cured at ambient temperature for 24–48 hours.

The molded articles exhibit the following physical properties before and after aging* at 260° C. for 500 hours.

| Test Temp. | Hardness Shore A | Modulus at 10% Elong. MPa | Tensile Strength MPa | Tear Strength KN/M | Elongation % |
|---|---|---|---|---|---|
| 25° C. | 68 | 1.31 | 3.40 | 11.60 | 34 |
| 232° C. | 65 | 0.92 | 2.35 | 5.30 | 28 |
| 232° C.* | 70 | 0.92 | 1.60 | 4.40 | 19 |

The physical properties after aging are excellent with practically no change in hardness. The weight loss on aging is very small (3.1 vs 6.0%) compared to materials containing no graphite powder). The thermal conductivity is also substantially improved ($11.1 \times 10^{-4}$ cal·sec.$^{-1}$·cm$^{-1}$·°C.$^{-1}$). The addition of synthetic graphite to the elastomer composition has no ngative effects but improves thermal conductivity by a factor of 2.7. These materials also show a smaller expansion than materials without the graphite powder. ($2.1 \cdot 10^{-4}$ in./in./°C.).

(1) The silica particulate of the base material is about 1093 arts by weight ground silica (Min-U-Sil) and about 58 parts by weight fumed silica (Cab-O-Sil MS-75). Min-U-Sil is a white powder with particles having an average diameter of about 5 microns and a specific gravity of about 2.65. Cab-O-Sil MS-75 has a specific gravity of 2.2 and an average particle diameter between about 0.07–0.1 microns. The base material further includes less than about 10 parts by weight of a platinum complex catalyst which is a vinyl siloxane oligomer modified by platinum metal (available from Dow Corning). The base material with these ingredients has a viscosity between 700–1300 poises at 25° C.

EXAMPLE 2

A base RTV silicone elastomer prepared as described in Example 1 is combined with the following ingredients:

| Component | Amount |
|---|---|
| 1. Base Material | 400.00 grams |
| 2. Synthetic Graphite (35–40 Microns) | 85.00 grams |
| 3. Silicone Fluid (100,000 Centistokes at 25° C.) | 40.00 grams |

-continued

| Component | Amount |
|---|---|
| 4. Silastic J Curing Agent | 40.00 grams |

The ingredients are preblended with a spatula and then placed in the Ross double planetary mixer for complete mixing. The mixing was completed in ten minutes. After deaeration of mix for 30 minutes, it was used for molding and determination of working time with Brookfield Viscometer (Model LV, Spindle #4). The working time was in desired range (7.4 hours).

After molding this silicone elastomer composite according to conditions described in Example 1, the virgin and aged* specimens at 260° C. for 500 hours have the following physical properties:

| Test Temp. | Hardness Shore A | Modulus at 10% Elong. MPa | Tensile Strength MPa | Tear Strength KN/M | Elongation % |
|---|---|---|---|---|---|
| 25° C. | 60 | 0.88 | 3.22 | 14.25 | 40 |
| 232° C. | 61 | 0.70 | 1.50 | 5.40 | 20 |
| 232° C.* | 62 | 0.75 | 1.05 | 4.30 | 16 |

The molded articles exhibited improved thermal conductivity ($8.3 \cdot 10^{-4}$ cal·sec$^{-1}$·cm$^{-1}$·°C.$^{-1}$). Lower weight losses are found after aging at 260° C. for 500 hours (2.8 vs 6.0). Aging also has absolutely no effect on hardness.

EXAMPLE 3

The base silicone elastomer of Example 1 is mixed with the following ingredients according to procedure of Example 1.

| Component | Amount |
|---|---|
| 1. Base Material | 400.00 grams |
| 2. Synthetic Graphite (Particle Size 35–40 Microns) | 100.00 grams |
| 3. Silicone Fluid (100,000 Centistokes at 25° C.) | 50.00 grams |
| 4. Silastic J Curing Agent | 40.00 grams |

The mixture has a working time of 8 hours. After molding the silicone compound according to conditions described in Example 1, the virgin and aged* specimens at 260° C. for 500 hours have the following physical properties.

| Test Temp. | Hardness Shore A | Modulus at 10% Elong. MPa | Tensile Strength MPa | Tear Strength KN/M | Elongation % |
|---|---|---|---|---|---|
| 25° C. | 63 | 1.00 | 3.30 | 11.20 | 50 |
| 232° C. | 67 | 1.10 | 2.90 | 5.93 | 36 |
| 232° C.* | 67 | 0.99 | 2.00 | 3.40 | 22 |

Molded articles have a thermal conductivity of $10.50 \times 10^{-4}$ cal·sec$^{-1}$·cm$^{-1}$·°C.$^{-1}$. They also exhibit lower weight losses after aging at 260° C. for 500 hours than the compounds without graphite. Accelerated aging also has no effect on hardness.

EXAMPLE 4

The base material of Example 1 is prepared again as described but no glass fibers and modifier are added to the mixture. The mix is combined with the following ingredients on a 80×180 mm two-roll research mill.

| Component | | Amount |
|---|---|---|
| 1. | Base Material | 400.00 grams |
| 2. | Synthetic Graphite (Particle Size 20–45 Microns) | 85.00 grams |
| 3. | Silicone Fluid (100,000 Centistokes at 25° C.) | 40.00 grams |
| 4. | Silastic J Curing Agent | 40.00 grams |
| 5. | Modifier E-1990-76) | 0.80 grams |

The working time of mix is within the desired range. The physical properties of molded specimens are as follows:

| Test Temp. | Hardness Shore A | Modulus at 10% Elong. MPa | Tensile Strength MPa | Tear Strength KN/M | Elongation % |
|---|---|---|---|---|---|
| 25° C. | 60 | 0.50 | 3.90 | 9.80 | 68 |
| 232° C. | 60 | 0.65 | 2.95 | 4.40 | 38 |
| 232° C.* | 62 | 0.60 | 2.25 | 5.00 | 29 |

The rectangular specimens exhibit improved thermal conductivity. They also have lower weight losses on aging than samples without the conductive filler. Accelerated aging has no effect on hardness.

EXAMPLE 5

The glass fibers and modifier are omitted from the base of Example 1. The base mixture is combined with the following ingredients in a Ross double planetary mixer:

| Component | | Amount |
|---|---|---|
| 1. | Base Material | 600.00 grams |
| 2. | Synthetic Graphite (Particle Size 35–40 Microns) | 150.00 grams |
| 3. | Silicone Fluid (100,000 Centistokes at 25° C.) | 60.00 grams |
| 4. | Silastic J Curing Agent | 60.00 grams |
| 5. | Cure Modifier E-1990-76 | 1.20 grams |

After mixing ingredients according to Example 1, the working time of mixture is 7.0 hours. After curing and post curing the compounds as in Example 1, molded articles exhibit the following properties:

| Test Temp. | Hardness Shore A | Modulus at 10% Elong. MPa | Tensile Strength MPa | Tear Strength KN/M | Elongation % |
|---|---|---|---|---|---|
| 25° C. | 62 | 0.66 | 3.80 | 9.70 | 63 |
| 232° C. | 62 | 0.77 | 3.00 | 4.70 | 37 |
| 232° C.* | 65 | 0.68 | 2.45 | 2.70 | 29 |

*Aged at 260° C. for 500 hours.

The thermal conductivity of molded specimens is $10.75 \times 10^{-4}$ cal·sec$^{-1}$·cm$^{-1}$·°C.$^{-1}$. They also show lower weight losses on aging than specimens without graphite filler. Accelerated aging has no effect on hardness.

EXAMPLE 6

To the base of Example 1 the following ingredients are added according to mixing procedure of Example 1.

| Component | | Amount |
|---|---|---|
| 1. | Base Material | 500.00 grams |
| 2. | Synthetic Graphite (Particle Size 15 Microns) | 102.00 grams |
| 3. | Silicone Fluid (100,000 Centistokes at 25° C.) | 50.00 grams |
| 4. | Silastic J Curing Agent | 50.00 grams |

Upon completion of mixing and deaeration of mixture, it has a working time of 1.5 hours. Molded specimens exhibit the following physical properties:

| Test Temp. | Hardness Shore A | Modulus at 10% Elong. MPa | Tensile Strength MPa | Tear Strength KN/M | Elongation % |
|---|---|---|---|---|---|
| 25° C. | 65 | 1.25 | 4.55 | 17.20 | 50 |
| 232° C. | 68 | 1.10 | 2.60 | 7.00 | 25 |
| 232° C.* | 68 | 0.99 | 1.30 | 4.60 | 14 |

*Aged at 260° C. for 500 hours.

The molded specimens exhibit improved thermal conductivities. Upon accelerated aging the specimens exhibit lower weight losses and hardness changes than specimens without graphite filler.

EXAMPLE 7

Example 1 is repeated with the exception that 85.00 grams of synthetic graphite and 60 grams of silicone fluid are used. The ingredients are mixed in a Ross double planetary mixer. The working time of mixture is 2.85 hours.

Molding of mix result in specimens with the following properties:

| Test Temp. | Hardness Shore A | Modulus at 10% Elong. MPa | Tensile Strength MPa | Tear Strength KN/M | Elongation % |
|---|---|---|---|---|---|
| 25° C. | 61 | 1.10 | 4.30 | 14.00 | 61 |
| 232° C. | 61 | 1.40 | 2.60 | 6.20 | 30 |
| 232° C.* | 65 | 0.95 | 1.60 | 3.80 | 18 |

*Aged at 260° C. for 500 hours.

The thermal conductivity of molded specimens is improved. Thermal stability is also improved.

EXAMPLE 8

The base material of Example 1 is mixed in a Hobart mixer with the following ingredients:

| Component | | Amount |
|---|---|---|
| 1. | Base Material | 400.00 grams |
| 2. | Synthetic Graphite (Particle Size 15 Microns) | 85.00 grams |
| 3. | Silicone Oil (60,000 Centistokes at 25° C. | 50.00 grams |
| 4. | Silastic J Curing Agent | 40.00 grams |

After completion of mixing schedule as in Example 1 and deaeration, the mixture has a working time of 5.00 hours.

The physical properties of virgin and heat aged* specimens has as follows:

| Test Temp. | Hardness Shore A | Modulus at 10% Elong. MPa | Tensile Strength MPa | Tear Strength KN/M | Elongation % |
|---|---|---|---|---|---|
| 25° C. | 64 | 0.99 | 3.50 | 11.40 | 46 |
| 232° C. | 64 | 0.94 | 2.85 | 5.90 | 34 |
| 232° C.* | 68 | 0.98 | 1.30 | 4.00 | 14 |

*Heat aged at 260° C. for 500 hours in an air-circulating oven.

The molded specimens exhibit improvements in thermal conductivity and stability over the values obtained from samples containing no graphite.

EXAMPLE 9

Example 8 is repeated with the exception that 60 grams of silicone oil (60,000 centistokes at 25° C.) is employed. The working time of mixture was 7.20 hours.

The physical properties of molded specimens are as follows:

| Test Temp. | Hardness Shore A | Modulus at 10% Elong. MPa | Tensile Strength MPa | Tear Strength KN/M | Elongation % |
|---|---|---|---|---|---|
| 25° C. | 63 | 0.84 | 3.71 | 10.30 | 68 |
| 232° C. | 63 | 0.89 | 2.50 | 5.70 | 38 |
| 232° C.* | 68 | 0.89 | 1.70 | 3.85 | 20 |

*Heat aged specimens at 260° C. for 500 hours in an air circulating oven.

Improved thermal conductivity and heat stability are obtained. Some of physical properties such as tensile strength and elongation determined at 232° C. are slightly improved.

EXAMPLE 10

The base of Example 1 without the modifier (working time) is combined with the following ingredients in a Ross double planetary mixer:

| | Component | Amount |
|---|---|---|
| 1. | Base Material | 400.00 grams |
| 2. | Synthetic Graphite (Particle Size 15 Microns) | 85.00 grams |
| 3. | Silicone Fluid (100,000 Centistokes at 25° C. | 80.00 grams |
| 4. | Silastic J Curing Agent | 40.00 grams |
| 5. | Cure Modifier E-1990-76 | 0.80 grams |

After completion of mixing and deaeration, the working time of mixture is 8.5 hours.

After molding the resulting articles have the following properties:

| Test Temp. | Hardness Shore A | Modulus at 10% Elong. MPa | Tensile Strength MPa | Tear Strength KN/M | Elongation % |
|---|---|---|---|---|---|
| 25° C. | 57 | 0.90 | 2.60 | 8.95 | 45 |
| 232° C. | 57 | 0.65 | 1.30 | 4.70 | 20 |
| 232° C.* | 62 | 0.75 | 1.30 | 3.70 | 19 |

*Heat aged at 260° C. for 500 hours in an air-circulating oven.

Improvement in thermal conductivity and thermal stability over the values of samples containing no graphite are obtained.

EXAMPLE 11

The following ingredients are combined with the base of Example 1:

| | Component | Amount |
|---|---|---|
| 1. | Base Material | 400.00 grams |
| 2. | Synthetic Graphite (Particle Size 35-40 Microns) | 60.00 grams |
| 3. | Synthetic Graphite (Particle Size 15 Microns) | 40.00 grams |
| 4. | Silastic J Curing Agent | 40.00 grams |
| 5. | Silicone Oil (100,000 Centistokes at 25° C.) | 40.00 grams |

Following mixing and deaeration the mixture has a working time of 2.10 hours. Molded specimens have the following properties:

| Test Temp. | Hardness Shore A | Modulus at 10% Elong. MPa | Tensile Strength MPa | Tear Strength KN/M | Elongation % |
|---|---|---|---|---|---|
| 25° C. | 66 | 1.30 | 4.70 | 16.70 | 47 |
| 232° C. | 66 | 1.35 | 2.70 | 6.90 | 22 |
| 232° C.* | 68 | 1.05 | 1.50 | 3.90 | 14 |

*Aged at 260° C. for 500 hours in an air-circulating oven.

Samples have improved thermal conductivity and stability.

EXAMPLE 12

The base of Example 1 without modifier (working time) is mixed with the following ingredients as in Example 1.

| | Component | Amount |
|---|---|---|
| 1. | Base Material | 400.00 grams |
| 2. | Synthetic Graphite (Particle Size 35-40 microns) | 60.00 grams |
| 3. | Synthetic Graphite (Particle Size 15 microns) | 30.00 grams |
| 4. | Silastic J Curing Agent | 40.00 grams |
| 5. | Silicone Oil (100,000 Centistokes at 25° C. | 40.00 grams |
| 6. | Cure Modifier E-1990-76 | 0.80 grams |

After blending ingredients in a Hobart mixer, the working time of mixture is 6.3 hours.

The physical properties of molded articles before and after aging* at 260° C. for 500 hours are as follows:

| Test Temp. | Hardness Shore A | Modulus at 10% Elong. MPa | Tensile Strength MPa | Tear Strength KN/M | Elongation % |
|---|---|---|---|---|---|
| 25° C. | 66 | 1.15 | 3.40 | 12.10 | 37 |
| 232° C. | 66 | 1.12 | 1.20 | 5.70 | 16 |
| 232° C.* | 69 | 1.10 | 1.60 | 3.80 | 16 |

The molded specimens exhibit a thermal conductivity of $9.3 \times 10^{-4}$ cal·sec$^{-1}$·cm$^{-1}$·°C.$^{-1}$. A lower weight loss and hardness change is also found when compared to similar samples containing no graphite powder.

EXAMPLE 13

The following ingredients are mixed with base of Example 1 according to procedure of Example 1:

| | Component | Amount |
|---|---|---|
| 1. | Base Material | 400.00 grams |
| 2. | Synthetic Graphite (Particle Size less than 150 microns) | 130.00 grams |

-continued

| | Component | Amount |
|---|---|---|
| 3. | Silastic J Curing Agent | 40.00 grams |
| 4. | Silicone Oil (100,000 Centistokes at 25° C.) | 40.00 grams |

This composition has a working time within the desired range.

The molded articles have a thermal conductivity of $11.4 \times 10^{-4}$ cal·sec$^{-1}$·cm$^{-1}$·°C.$^{-1}$. They also exhibit lower weight loss and hardness change than similar materials containing no graphite powder.

EXAMPLE 14

Example 1 is repeated with the exception that synthetic graphite of particle size less than 45 microns is used. The working time of composition is 6.0 hours.

The physical properties before and after aging* at 260° C. for 500 hours are as follows:

| Test Temp. | Hardness Shore A | Modulus at 10% Elong. MPa | Tensile Strength MPa | Tear Strength KN/M | Elongation % |
|---|---|---|---|---|---|
| 25° C. | 63 | 0.80 | 2.70 | 16.00 | 41 |
| 232° C. | 64 | 0.82 | 2.55 | 7.10 | 29 |
| 232° C.* | 64 | 0.70 | 1.15 | 3.20 | 15 |

The thermal conductivity of these samples is $2.5 \times 10^{-4}$ cal·sec$^{-1}$·cm$^{-1}$·°C.$^{-1}$. Improvements in percent weight loss and hardness change are observed.

EXAMPLE 15

Example 1 is repeated with the exception that synthetic graphite of particle size less than 75 microns is mixed with other ingredients. The working time of mixture is 15.0 hours. The physical properties before and after aging* at 260° C. for 500 hours are as follows:

| Test Temp. | Hardness Shore A | Modulus at 10% Elong. MPa | Tensile Strength MPa | Tear Strength KN/M | Elongation % |
|---|---|---|---|---|---|
| 25° C. | 65 | 0.88 | 4.00 | 12.80 | 66 |
| 232° C. | 65 | 0.90 | 3.00 | 5.80 | 37 |
| 232° C.* | 68 | 0.90 | 1.65 | 3.70 | 19 |

The thermal properties and hardness change are improved over those of similar materials containing no graphite powder.

EXAMPLE 16

The base of Example 1 is mixed with the following ingredients in a Ross double planetary mixer.

| | Component | Amount |
|---|---|---|
| 1. | Base Material | 400.00 grams |
| 2. | Crystalline Graphite (Particle Size 35-40 microns) | 85.00 grams |
| 3. | Silicone Oil (100,000 Centistokes at 25° C.) | 40.00 grams |
| 4. | Silastic J Curing Agent | 40.00 grams |

The working time of mix is 9.5 hours.

The physical properties of virgin and aged* samples at 260° C. for 500 hours are as follows:

| Test Temp. | Hardness Shore A | Modulus at 10% Elong. MPa | Tensile Strength MPa | Tear Strength KN/M | Elongation % |
|---|---|---|---|---|---|
| 25° C. | 64 | 0.97 | 3.10 | 12.30 | 43 |
| 232° C. | 64 | 0.99 | 2.33 | 6.30 | 24 |
| 232° C.* | 68 | 0.96 | 1.70 | 4.60 | 14 |

Molded specimens have a thermal conductivity of $12.9 \times 10^{-4}$ cal·sec$^{-1}$·cm$^{-1}$ °C.$^{-1}$. Lower weight loss on aging at 260° C. for 500 hours is observed. The hardness change on aging is also very small.

EXAMPLE 17

Example 1 is repeated with the exception that flake graphite is used (particle size 10 microns). The working time of mixture is very short. The physical and thermal properties of molded articles are inferior to those described in Examples 1–16.

EXAMPLE 18

Repeat Example 1 with the exception that 100 grams of silicone fluid (100,000 centistokes at 25° C.) is used. Longer working times are obtained. Molded articles exhibit improvements in thermal conductivity.

EXAMPLE 19

Example 1 is repeated with the exception that 30 grams of silicone fluid (60,000 centistokes at 25° C.) are used. The molded articles exhibit improvements in thermal conductivity.

EXAMPLE 20

Example 1 is repeated with the exception that 15 grams of silicone fluid (30,000 centistokes at 25° C.) used. A moldable composition is prepared showing improvement in thermal conductivity.

EXAMPLE 21

Examples 1–20 are repeated with the exception that 0.6 grams of modifier (working time) are used. Molded specimens exhibit improvements in thermal conductivity.

EXAMPLE 22

Example 1–20 are repeated with the exception that 1.5 grams of modifier are used. Moldable compositions are prepared.

EXAMPLE 23

Example 1 was repeated with the exception that synthetic graphite is replaced by 75 grams carbon black (N-650, particle size 0.05 microns). The composition has a 4.0 hour working time. Molded articles show improvements in thermal conductivity over materials containing no conductive filler.

EXAMPLE 24

The amount of carbon black (N-650) in Example 23 is increased to 100.00 grams. The mixture has a shorter working time. Molded specimens have the following physical properties before and after aging* at 260° C. for 500 hours:

| Test Temp. | Hardness Shore A | Modulus at 10% Elong. MPa | Tensile Strength MPa | Tear Strength KN/M | Elongation % |
|---|---|---|---|---|---|
| 25° C. | 72 | 1.22 | 3.22 | 13.80 | 32 |
| 232° C. | 72 | 0.96 | 1.50 | 5.64 | 17 |
| 232° C.* | 81 | 1.72 | 1.76 | 4.20 | 10 |

Improvements in thermal conductivity are found.

EXAMPLE 25

Example 23 is repeated with the exception that 75.00 grams of SL-90 carbon black is used. The mixture has a working time of 7.0 hours. Molded articles exhibit the following physical properties:

| Test Temp. | Hardness Shore A | Modulus at 10% Elong. MPa | Tensile Strength MPa | Tear Strength KN/M | Elongation % |
|---|---|---|---|---|---|
| 25° C. | 60 | 0.60 | 2.10 | 12.2 | 35 |
| 232° C. | — | — | — | — | — |
| 232° C.* | 60 | 0.60 | 0.70 | 3.10 | 12 |

*Heat aged at 260° C. for 500 hours in an air circulating oven.

Improvements in thermal conductivity and lower weight loss are found.

EXAMPLE 26

Example 25 is repeated with the exception that 90.00 and 100 grams of SL-90 carbon black are used. The mixtures have shorter working times.

EXAMPLE 27

Example 23 is repeated with the exception that 75.00 grams of N-339 carbon black is used. Moldable mixtures are obtained. Improvements are obtained in thermal properties.

EXAMPLE 28

Example 23 is repeated with the exception that 75.00 grams of N-765 carbon black are used in preparing the mixture. Moldable materials are obtained.

In the above examples 1-28 the silicone fluid is Silicone Fluid 200 (viscosity modifier) which is a silicone fluid number designation of fluid available from the Dow Corning Corporation. Silicone fluid designated by viscosity are also available from Dow Corning.

The Silastic J, E and L (i.e. crosslinking polymer) as well as Silastic Curing Agent (i.e. crosslinking oligomer) and Cure Modifier E-1990-76 are also available from the Dow Corning Corporation.

Information on the Silicone Fluid 200 used in the above Examples may be obtained from Form No. 22-069C-76 of Dow Corning Corp. Information on Silicone Fluid 705 (Dow Corning 705 Diffusion Pump Fluid described as pentaphenylmethyltri-siloxane) used in the above Examples may be had from Bulletin 22-287 dated 8/74 from Dow Corning Corp. Information on Silastic J RTV Silicone Elastomer (and curing agent) used in the above Examples may be obtained from Form No. 61-080A-76 of Dow Corning Corp. Information on Silastic E and L elastomers used in the above Examples may be obtained from Form No. 61-326-76 of Dow Corning Corp. These ingredients are all deemed within the scope of the invention as hereinbefore disclosed.

It is to be understood that organosiloxanes as hereinbefore described by formula (e.g. formula I, I', II, etc.) may as a practical matter also contain minor amounts (e.g. up to about 20 weight percent) of siloxane impurities which do not correspond to the formula as set forth and still be within the scope of this invention.

What is claimed is:

1. A dispensable precursor composition for highly filled, thermally conductive elastomers which composition consists essentially of I. 100 parts by weight of an olefinically unsaturated polysiloxane having the formula:

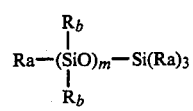

wherein at least most of the Ra's and Rb's are selected from (A) saturated hydrocarbyl or hydrocarbyloxy groups having a total of 1 to about 10 carbon atoms that are alkyl or aryl or alkyl and aryl and (B) allyl or vinyl groups, but wherein up to about 25% of the Rb's may be

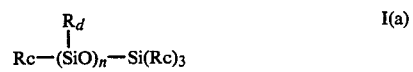

wherein at least most of the Rc's and Rd's are selected from (A) and (B) above but up to about 10% of the Rd's may contain additional siloxane units with substituents selected from (A) and (B) or still additional siloxane units; and still further wherein (1) the average number of siloxane units per polymer molecule is between 100 and 300 and (2) there is an average of above about 1.5 but lower than 6 crosslinking sites selected from the vinyl, allyl or vinyl and allyl groups per polymer molecule;

II. about 35–550 parts by weight of finely divided particulate comprising:
   (A) silica particulate at a weight ratio to the polysiloxane of I. of between about 1:4 to 3:1 wherein the silica particulate comprises:
   1. ground silica having an average particle diameter between about 0.1 and 15 microns; and
   2. fumed silica having an average particle diameter between about 0.005 and 0.015 microns;
   (B) thermally conductive carbon powder at a weight ratio to the polysiloxane of I. of between about 1:10 to 2.5:1;

III. a viscosity modifier comprising a silicone oil having a viscosity between about 1000–1,000,000 centistokes at 25° C. at a weight ratio to the particulate of II of between about 1:20 to 1:4 oil to particulate; and IV. a silyl hydride functional polysiloxane oligomer containing between about 5–50 siloxane groups that crosslinks with I at a weight ratio with respect to the polysiloxane of I. of between about 1:3 to 1:20, the silyl hydride functional polysiloxane oligomers having an average of up to about 20 silyl hydride groups per polymer chain.

2. The precursor composition in accordance with claim 1 wherein the crosslinkable polysiloxane is substantially free of branching.

3. The precursor composition in accordance with claim 1, wherein the viscosity modifier comprises a dialkylpolysiloxane.

4. The precursor composition in accordance with claim 3 wherein I (B) is vinyl.

5. The precursor composition in accordance with claims 1 or 2 or 3 or 4 wherein the conductive carbon powder comprises graphite.

6. The precursor composition in accordance with claim 5, wherein the silicone oil is selected from the group consisting of dimethyl silicone, methyl phenyl silicone, branched methyl phenoxy silicone, branched chlorophenyl silicone, fluorosilicone, nitride silicone, methyl hydrogen and methyl vinyl silicone oils and combinations of two or more of them.

7. The precursor composition in accordance with claim 5, wherein the silyl hydride functional polysiloxane has the formula:

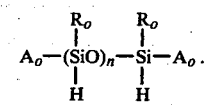

wherein n averages between about 5 and about 14, $R_o$ and $A_o$ are selected from the group consisting of alkyl or alkoxy groups having 1–3 carbons, phenyl and phenoxy groups.

8. The precursor composition in accordance with claims 1 or 2 or 3 or 4 wherein the weight ratio of II. A to II. B is greater than about 2:1.

9. An elastomer made from the precursor composition of claims 1 or 2 or 3 or 4.

10. An elastomer in accordance with claim 9, wherein the weight ratio of silica to the polysiloxane of I. is between about 0.9:1 to 1:0.9.

* * * * *